Figure 2:
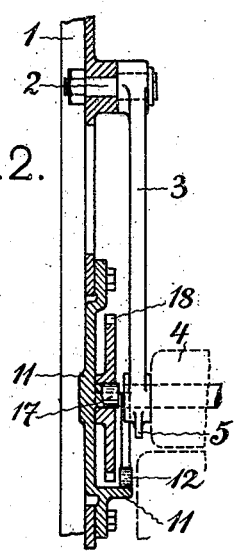

W. A. WÜST.
MACHINE FOR DRESSING OR OTHERWISE OPERATING UPON SKINS, HIDES, OR THE LIKE.
APPLICATION FILED SEPT. 28, 1908.

953,936.

Patented Apr. 5, 1910.

5 SHEETS—SHEET 1.

Witnesses.

Inventor:
Wilhelm Adolf Wüst
PER G. Dittmar.
Attorney.

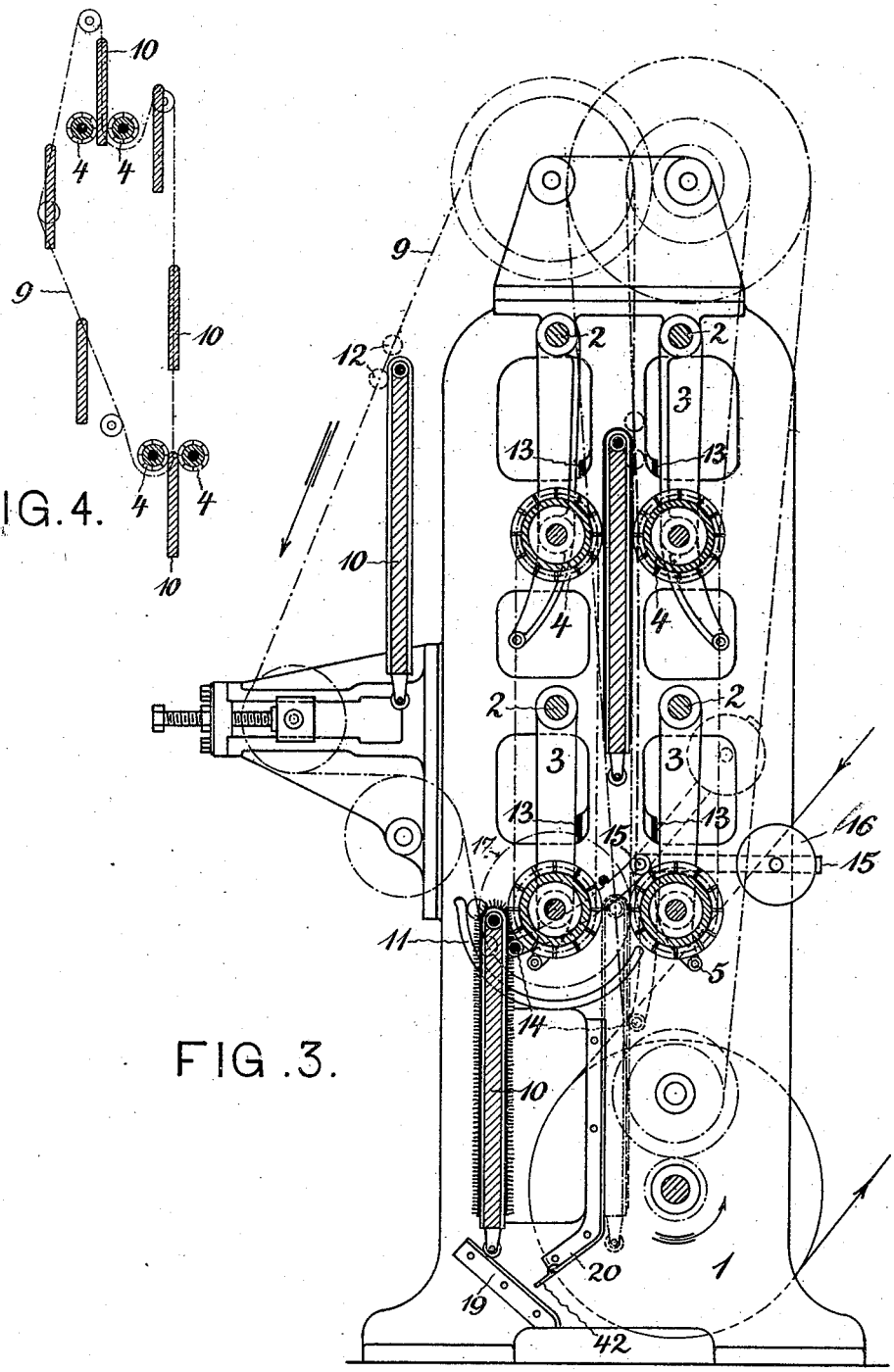

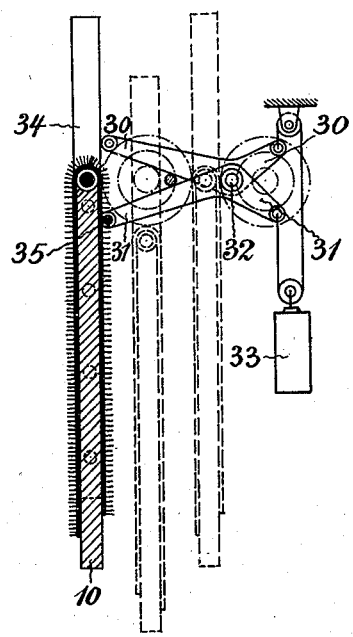
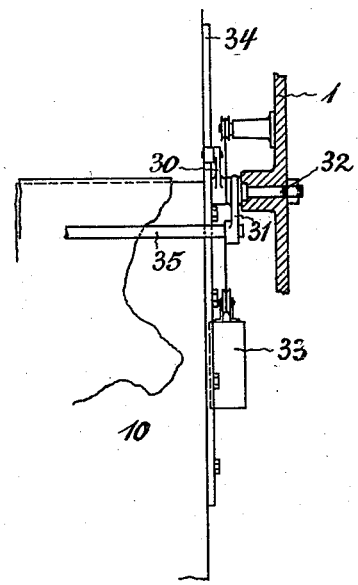
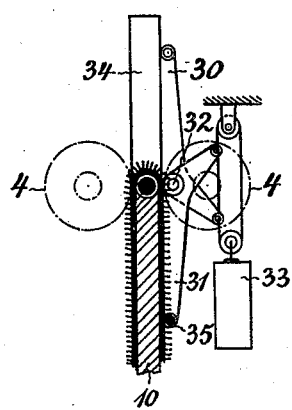
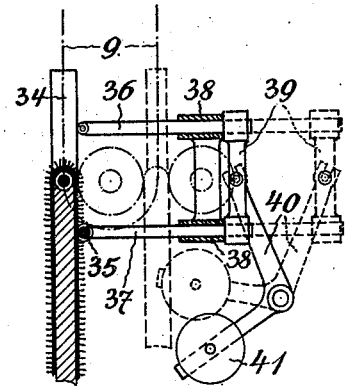

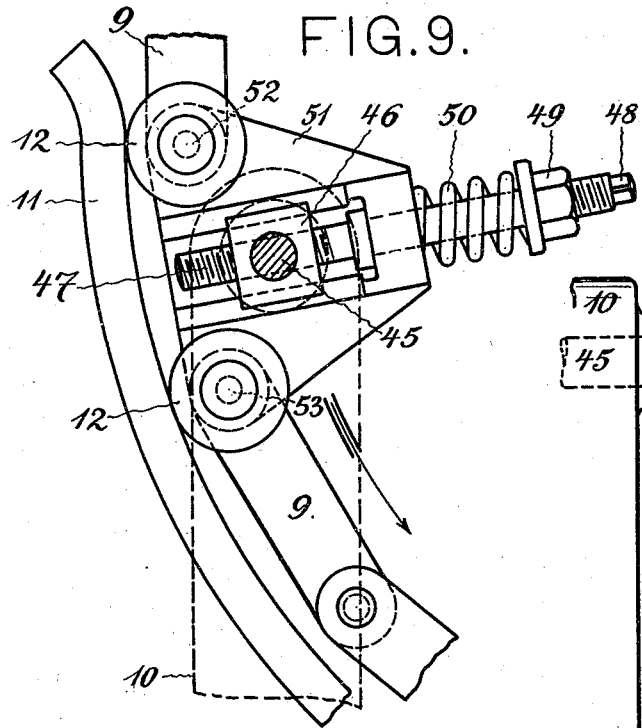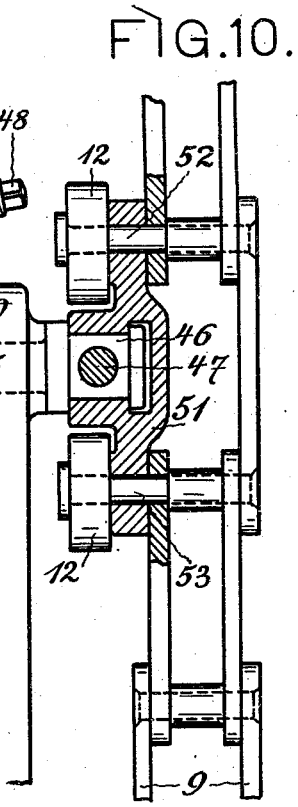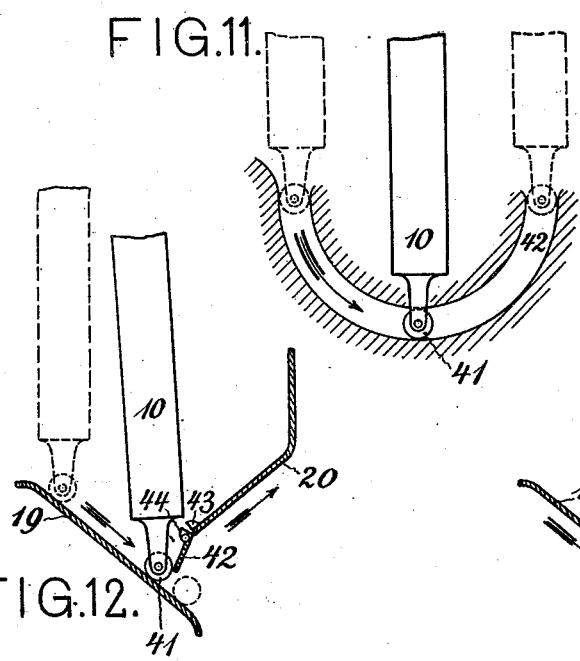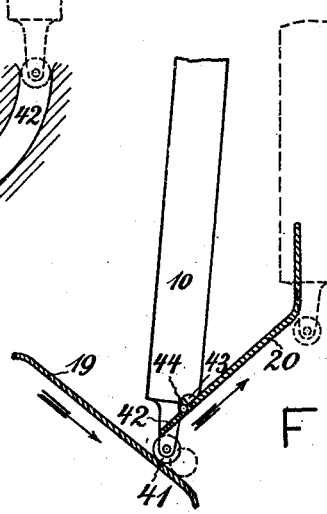

W. A. WÜST.
MACHINE FOR DRESSING OR OTHERWISE OPERATING UPON SKINS, HIDES, OR THE LIKE.
APPLICATION FILED SEPT. 28, 1908.
953,936.
Patented Apr. 5, 1910.
5 SHEETS—SHEET 5.
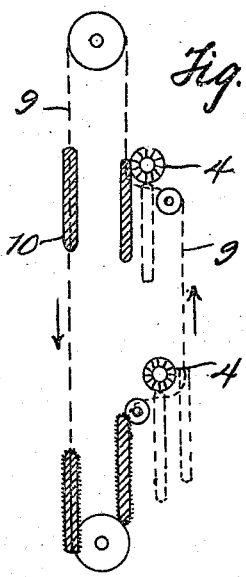
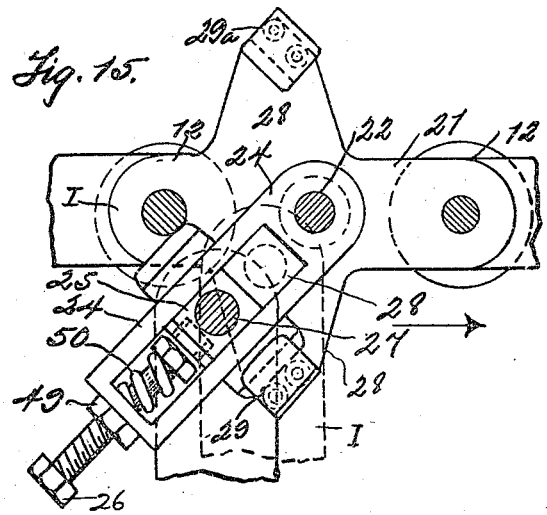
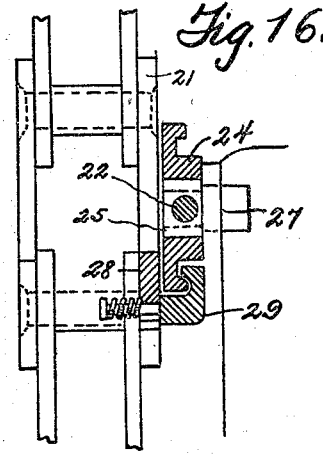
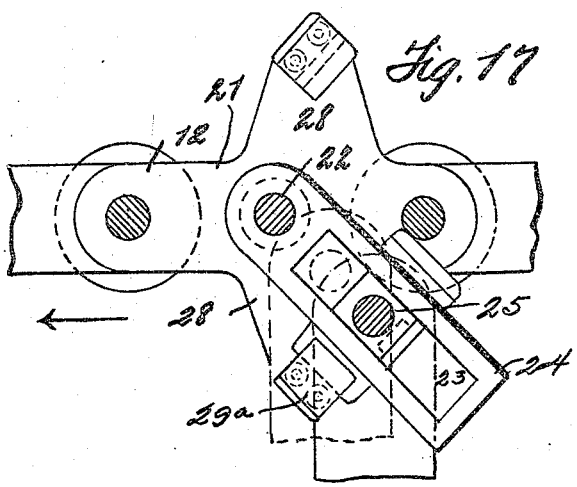
Witnesses
E. H. Bond
Anton W. Selander.
Inventor
Wm. A. Wüst
By
F. Dittmar
Attorney

UNITED STATES PATENT OFFICE.

WILHELM ADOLF WÜST, OF FRANKFORT-ON-THE-MAIN, GERMANY, ASSIGNOR TO MOENUS MACHINE WORKS, LTD., OF FRANKFORT-ON-THE-MAIN, GERMANY.

MACHINE FOR DRESSING OR OTHERWISE OPERATING UPON SKINS, HIDES, OR THE LIKE.

953,936. Specification of Letters Patent. Patented Apr. 5, 1910.
Application filed September 28, 1908. Serial No. 455,199.

*To all whom it may concern:*

Be it known that I, WILHELM ADOLF WÜST, a subject of the King of Prussia, residing at No. 166 Kettenhof Weg, in the city of Frankfort-on-the-Main, Kingdom of Prussia, and Empire of Germany, have invented new and useful Improvements in Machines for Dressing or Otherwise Operating Upon Skins, Hides, Leather, or the Like, of which the following is a specification.

This invention relates to improvements in machines for dressing or otherwise operating upon skins, hides, leather or the like, and, more particularly, machines of that type in which a series of work tables are suspended vertically from a pair of endless traveling chains or equivalents and the hides or the like are hung over these tables and, hanging on both sides thereof, are carried thereby between, and operated upon by, dressing rolls or other tools arranged alongside the path of the work table. In all the known machines of this kind, special devices or special tools are necessary for effecting the working of the strip of hide which lies over the edge of the table and remains untouched by the dressing rolls or the like referred to.

The invention consists essentially in that the hide or the like is operated upon regularly over its whole surface in a single passage through the machine without the aid of special devices such as special dressing rolls, special work carriers or special tools, and without displacement of the hides or the use of any known mechanism for working that strip of the hide which lies over the edge of the table, solely by guiding the table, which is pivotally suspended from the traveling chains or the like centrally of the curve of its half-round upper edge, with the hide or the like thereon, first in a semi-circle around one of the two rotating dressing rolls parallel and in continuous close contact therewith, and then directly thereupon drawing it—always by means of the traveling chains—between the two rolls. The hide or the like lies upon the table in the same position from the moment it is placed thereon in its unworked state until it is removed therefrom uniformly treated in a perfectly continuous operation upon the whole of its surface.

Any desired number of tables may be employed in a machine constructed in accordance with the present invention and it is only necessary to have two rotating dressing rolls or the like mounted alongside the path traversed by the work to insure perfectly constant working. The action of the dressing roll knives upon the work when the table is being guided around the respective dressing roll is insured by guiding the table positively in a cam groove concentric with the said roll. The adjustment of the working pressure during this part of the operation is rendered easy and variable at will by the yieldingly arranged suspension pin of the table being displaceable radially of the guide curve.

For heavy work and for working in certain ways it is not necessary to provide any means for holding the work while the strip which lies over the edge of the table is being operated on; but in case of need it is a very easy matter to provide means such as light yielding rollers, rods or the like for this purpose.

The swinging of the table around its point of suspension is prevented either by guiding its lower end in a groove by means of a roller mounted thereon, or by guiding it so that it hangs vertically or approximately vertically by means of a special mechanism. Like means for guiding the tables may be provided for guiding them around a second pair of working rolls directly after the table has left the first pair, in order to subject the work in this way to a second working directly after the first. In most cases it is sufficient for perfect working to arrange one dressing roll on each side of the path traversed by the work; but it is also here a very easy matter to mount another roll opposite each of the two existing rolls, so that the hide or the like hanging on both sides of the table receives a double working.

Figure 1:
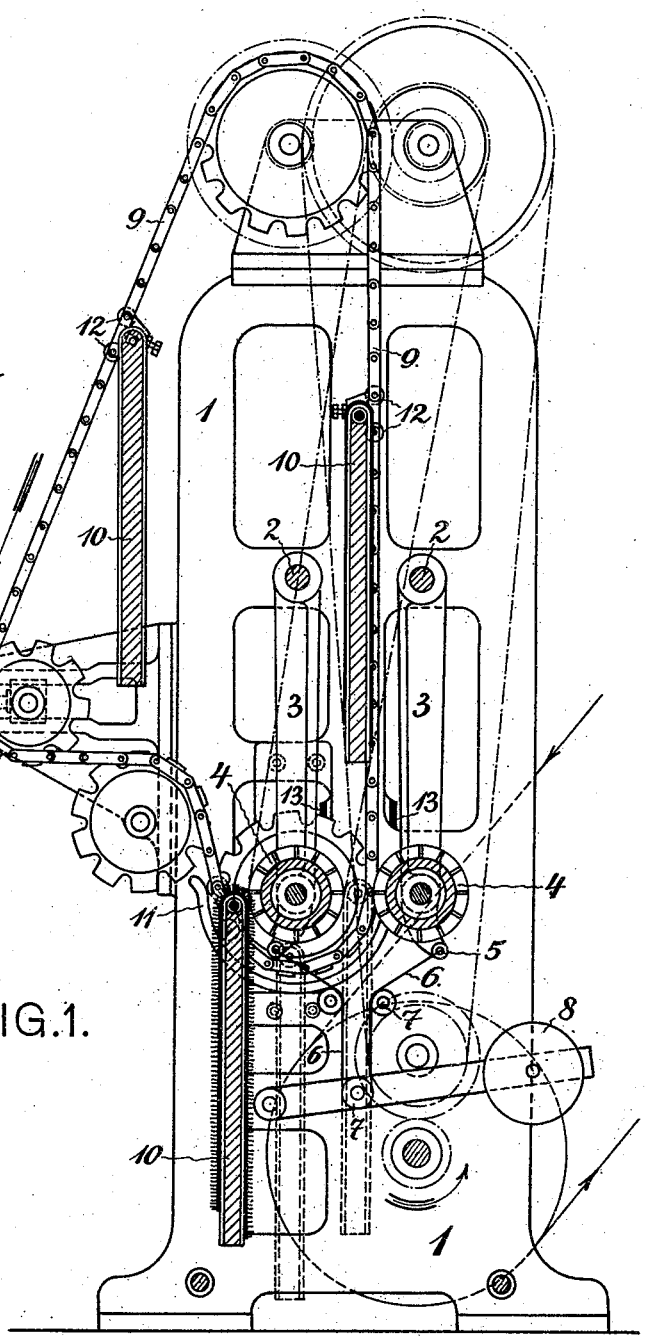

The invention is illustrated in the accompanying drawings, in which:

Figure 1 is a cross-section through the machine showing the arrangement of the main parts of the machine and the characteristic guiding of the work carrier around the dressing roll. Fig. 2 is part of a longitudinal section of the machine, showing the arrangement of the cam for guiding the work around one of the two dressing rolls and the suspension of the dressing rolls in the standards of the machine. Fig. 3 is also a cross-section through the machine, showing the arrangement for holding the hide and for guiding the table during the working of the strip lying over its edge, and also the arrangement of a second pair of dressing rolls which serve for subjecting the parts of the hide hanging on each side of the table to a second working. Fig. 4 is a diagram of an arrangement of the machine in which the complete hide or the like, inclusive of the strip lying over the edge of the table, is subjected to a double working. Fig. 5 shows a device for holding the hide during the working of the strip lying over the edge of the work table, with a counter-pressure device for keeping the table approximately vertical as it is being guided around the dressing roll which is operating upon it. Fig. 6 shows another view of the same device. Fig. 7 shows the position of the two presser levers while the table is passing between the two dressing rolls. Fig. 8 shows means for holding the hide, likewise with a counter-pressure device, which requires exact parallel guiding of the table around the respective dressing rolls during the working of the strip lying over the edge of the table. Figs. 9 and 10, show the adjustable means for yieldingly suspending the table or work carrier from the traveling chains or the like. Fig. 11 shows the guiding of the table by means of a roller in a semi-circular cam groove during the working of the strip of hide lying over the edge of the table, instead of, or in conjunction with, the means shown in Figs. 5–8 for guiding the table parallel or approximately parallel. Figs. 12 and 13 show this guiding as an approximately parallel guiding upon two oppositely inclined straight surfaces with a device for preventing jerking of the guide roller on the change of direction of the vertical movement of the table. Fig. 14 is a diagram showing the arrangement of one dressing roll on each side of the work path so that the one roll works the one-half of the hide from the crown to the rounded edge of the table and the other roll works the other half. Figs. 15, 16 and 17 show a method of carrying out the suspension of the tables to suit the arrangement shown in Fig. 14. Fig. 16 is a cross section through Fig. 15 through the suspension device.

In Figs. 1–8, 1 indicates the side standards of the machine, upon which arms 3 that carry the two dressing rolls 4 are pivoted by means of pins 2 which may be displaceable horizontally. The lower ends 5 of these arms are pressed yieldingly against each other, or against the tables 10 as they are drawn by the traveling chains 9 between the rolls 4, by means of a weight 8 acting through a cord 6 which passes over rollers 7. The guide cam 11 insures engagement with the tool during the working of the strip of hide or the like which lies over the edge of the table. Rollers 12 mounted upon the suspension member of the table are guided by the cam 11 as the table passes around the dressing roll. Two adjustable stops 13 prevent the dressing rolls, which are suspended concentrically with the cam 11, from swinging toward the one side and the weight 8 opposes the full working pressure to movement outward of the said rolls toward the other side. In order to hold the hide or the like in position upon the table during the working of the strip lying over the edge of the table, a small presser-roller 14 may be mounted as shown in Fig. 3, which roller presses the hide upon the table by the action of a weight 16 upon the bell-crank lever 15. This presser-roller 14 follows the movement of the work table until the latter enters between the two dressing rolls. The cam 11 is fixed upon the standard 1, and at its center a stud 17 is turned, as shown in Fig. 2, upon which the chain wheel 18 rotates concentric with the cam groove 11 and the dressing roll. The table is guided to prevent it swinging or yielding as it passes around the one dressing roll by means of a roller mounted on its lower end and two oblique surfaces indicated in Fig. 3 by the numerals 19 and 20.

The construction shown in Figs. 15, 16 and 17 permits of moving the work table toward the axis of rotation of the dressing rolls when they become worn, and also, owing to the spring suspension, compensate for irregularities in the hide, or, by compressing the spring, serves to increase the working pressure. In Figs. 15, 16 and 17 (the table suspension for the arrangement shown in Fig. 14) 21 is a link of the traveling chain, that carries midway of its length a stud 22 upon which a part 24 which is formed with a slot 23 is rotatably mounted. A slide-block 25 is guided in the slot 23, and it can be displaced therein by means of a screw 26 which is rotatably connected with the said block. The table 10 is suspended upon a stud 27 turned upon the slide-block 25, and between the latter and the part 24, a spring 50 is introduced so that the table is yieldingly suspended and regulation of the working pressure in operating upon the strip of hide lying over the edge of the table is permitted. The chain link 21 is further provided with two stops 28 which carry two spring-pressed nose-pieces 29 and 29$^a$ that hold the part 24 in the position shown in Fig. 15 when the table is being guided around the lower roll 4, and in the position shown in Fig. 17 when the table is being guided around the upper roll 4, the chain in its course having turned through an angle of 180°, as will be seen from Fig. 14. When the chain is traveling vertically, the pivotally suspended part 24 carrying the table hangs parallel with chain, and when the chain is traveling horizontally toward the right, the part 24 takes up the position shown in Fig. 15. The nose-piece 29 snaps into a notch in the part 24 and holds the said part securely in this position until the table has passed the dressing roll, when the spring nose piece 29 strikes an oblique projection and is pushed back, thereby releasing the part 24, which, when the chain is again traveling vertically after leaving the dressing roll, again takes up the position in which it is freely suspended. In traversing the second horizontal part of the path below the upper dressing roll 4 toward the left, i. e. after the complete suspension device has turned through an angle of 180° since traversing the horizontal part of the path below the lower dressing roll 4 and has taken up the position shown in Fig. 17, the part 24 snaps into the spring nose-piece 29ª and is held thereby in the respective position until the table has passed the second dressing roll; a second oblique projection then disengages the nose-piece 29ª from the part 24 and the latter again hangs free with the table.

When the dressing rolls become worn, it is necessary to bring the work nearer to the axis of rotation of the rolls in operating upon the strip lying over the edge of the table than was previously requisite, and this is done by turning the screw 26 of the slide-block 25 and thus bringing the table 10 nearer to the axis of the rolls. The regulation of the working pressure is effected by turning the nut 49.

In the construction of the machine shown in Fig. 5, wear and tear of the dressing rolls may be compensated for by suspending the table in the same or a similar manner to that adopted in the construction shown in Fig. 14.

In Figs. 5, 6 and 7, 30 and 31 are two bell-crank levers which are rotatably mounted upon a bolt 32 fixed in the standard 1, and the ends of the shorter arms of which are connected by a cord that is acted upon by a weight 33. The other arms of these levers are connected by the bar 35 seen in Figs. 6 to 9. Under the action of this weight, the other end of the lever 30 is pressed against a flat iron rail 34 which is fixed on the side of the table 10 and projects upward beyond the point of suspension, thus opposing a counter pressure to the pressure exerted by the other end of the lever 31 upon a rod 36 and by the latter upon the work and the table. A similar action and perfectly parallel guiding of the table is attained by the arrangement shown in Fig. 8. The two parallel rods 36 and 37, which are secured in long guideways 38 against lateral displacement and connected rigidly with each other by means of a link 39 are pressed against the table 10 and the rails 34 by the weight 41 acting through the bell-crank lever 40. Tilting of the table while it is being guided around the dressing rolls is thereby obviated. In many cases it is advantageous also to guide the table at its lower end during the working of the strip lying over the edge of the table. This may be done as shown in Fig. 11 by guiding a roller 41 mounted on the lower end of the table 10 in a circular groove 42 in a plate or the like fixed upon the standard, or, as already indicated in Fig. 2 and shown on a larger scale in Figs. 12 and 13, by the rollers 41, which are mounted on the lower end of the table at both sides, rolling upon the two oblique guide surfaces 19 and 20. In this arrangement a flap 42 is hinged on the part 20, which can only yield in one direction, as shown in Fig. 12, and which is brought back into the position shown in Fig. 13 by a spring, mounted on its hinge pin, and held there by the stops 43 and 44, as soon as the roller 41 reaches its lowest position, indicated by the dotted circle in Fig. 12, and has released the flap 42 permitting the spring to act upon it. The arrows indicate in all the figures the direction in which the work travels—i. e. the direction of movement of the tables.

The device for suspending the tables upon the traveling chains or the like is shown in Figs. 9 and 10 on a larger scale. It permits, firstly, wear and tear of the dressing rolls to be reckoned with, i. e. it enables the work carrier to be correspondingly adjusted and, secondly, it permits of regulating the working pressure in operating upon the strip lying over the edge of the table. The first of these objects is attained by turning the screw 47 by means of its square head 48 so as to move the slide-block 46, that carries the pin 45 upon which the table 10 is suspended, nearer to or farther away from the chain 9. The regulation of the working pressure is effected by regulating the tension of the spring 50 by means of the nut 49. The part 51 carries the members 40 to 50 and forms at the same time a link of the chain, and upon both of the chain-link bolts 52 and 53, rollers 12 are mounted which are guided by the cam surface 11 and thus render possible exact working of the strip of hide or the like lying over the edge of the table as it passes under the respective dressing roll.

I claim:

1. A machine for dressing or otherwise operating upon skins, hides, leather or the like, comprising a series of vertically-suspended traveling work tables, over which the hides or the like are laid, curved guides for guiding the tables before entering between the dressing rolls and a pair of dressing or working rolls mounted—one on each side—alongside the path traversed by the said tables, one of the said dressing rolls, in addition to working that portion of the hide hanging on one face of the table, being constructed to operate regularly upon the whole surface of the strip of hide or the like lying over the edge of the table in a single passage through the machine, the construction being such that the hide does not have to be displaced upon the table and without the aid of special tools, rolls, work-carriers or other known mechanisms for working the strip of hide or the like lying over the edge of the table.

2. In a machine for operating upon hides, skins and the like, a series of vertically suspended traveling work tables, a pair of dressing or working rolls mounted one on each side alongside the path traversed by said tables, and curved guides for guiding the tables before entering between the dressing rolls, whereby the strip of hide lying over the edge of the table is presented to one of said dressing rolls and pressed thereagainst.

3. In a machine for operating upon hides, skins and the like, a series of vertically suspended traveling work tables, a pair of dressing or working rolls mounted one on each side alongside the path traversed by said tables, and curved guides for guiding the tables before entering between the dressing rolls, so constructed that the strip of hide lying over the edge of the table is presented to one of said dressing rolls and pressed thereagainst, said dressing rolls being arranged the one to work one-half of the hide from the crown or point where it is bent over the edge of the table and the other constructed to work the other half of the hide from said point.

4. In a machine for treating hides and the like, a series of vertically suspended traveling work tables and chains carrying said tables and from which the latter are adjustably and yieldingly suspended.

5. In a machine for treating hides and the like, a series of vertically suspended traveling work tables, means for guiding the tables to cause them to hang substantially vertically during the working of the strip of hide which lies over the edge of the table, a pair of dressing or working rolls, one on each side along the path traversed by said tables, and chains and means for yieldingly suspending said tables from said chains.

In testimony whereof I affix my signature in the presence of two witnesses.

WILHELM ADOLF WÜST.

Witnesses:
   JEAN GRUND,
   CARL GRUND.